(12) United States Patent
Carter et al.

(10) Patent No.: US 7,287,868 B2
(45) Date of Patent: Oct. 30, 2007

(54) REARVIEW MIRROR WITH INTEGRATED FRAME

(75) Inventors: John W. Carter, Holland, MI (US); Wayne Rumsey, Zeeland, MI (US); Kenton J. Ypma, Hudsonville, MI (US); Daniel J. Bostwick, Grandville, MI (US); Jeremy A. Fogg, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 101 days.

(21) Appl. No.: 10/405,526

(22) Filed: Apr. 2, 2003

(65) Prior Publication Data

US 2004/0196577 A1 Oct. 7, 2004

(51) Int. Cl.
*G02B 7/182* (2006.01)

(52) U.S. Cl. .................. 359/871; 359/872; 359/603

(58) Field of Classification Search ......... 359/871–877, 359/507–514, 601–605, 838
See application file for complete search history.

(56) References Cited

U.S. PATENT DOCUMENTS

| | | | |
|---|---|---|---|
| 3,467,465 A | | 9/1969 | Van Noord |
| 5,151,824 A | * | 9/1992 | O'Farrell .................. 359/604 |
| 5,245,480 A | * | 9/1993 | Polzer ...................... 359/841 |
| 5,327,288 A | * | 7/1994 | Wellington et al. ......... 359/606 |
| 5,448,397 A | | 9/1995 | Tonar |
| 5,521,760 A | * | 5/1996 | De Young et al. .......... 359/601 |
| 5,572,354 A | * | 11/1996 | Desmond et al. ........... 359/265 |
| 6,022,070 A | | 2/2000 | Ashina et al. |
| 6,068,380 A | | 5/2000 | Lynn et al. |
| 6,124,886 A | * | 9/2000 | DeLine et al. .............. 348/148 |
| 6,170,956 B1 | | 1/2001 | Rumsey et al. |
| 6,195,194 B1 | | 2/2001 | Roberts et al. |
| 6,239,899 B1 | | 5/2001 | DeVries et al. |
| 6,315,421 B1 | * | 11/2001 | Apfelbeck et al. .......... 359/871 |
| 6,329,925 B1 | | 12/2001 | Skiver et al. |
| 6,407,468 B1 | | 6/2002 | LeVesque et al. |
| 6,648,477 B2 | * | 11/2003 | Hutzel et al. ............... 359/604 |
| 2002/0097494 A1 | * | 7/2002 | Waldmann .................. 359/603 |
| 2002/0171906 A1 | | 11/2002 | Busscher et al. |
| 2005/0152052 A1 | * | 7/2005 | Lawlor et al. .............. 359/871 |

OTHER PUBLICATIONS

Appendix A is a prior art mirror construction made by Schefenacker Vision Systems, prior to Apr. 2, 2003, which includes a bezel for supporting a mirror element, an angularly-adjustable mount, and a rear housing attached to the bezel.

* cited by examiner

*Primary Examiner*—Alessandro Amari
(74) *Attorney, Agent, or Firm*—Price, Heneveld, Cooper, DeWitt & Litton, LLP

(57) ABSTRACT

An electrochromic mirror includes an integrated internal plate frame with an electrochromic mirror subassembly adhered to its flat front surface, electrical components supported on a rear with the frame acting as a heat sink and EMI/RFI shield, and a back cover supported on the plate frame. The subassembly is uniformly supported across the front surface of the plate frame for good mirror impact resistance. The mirror is supported by an angularly adjustable ball-and-socket connection. In one embodiment, the ball is formed integrally on the plate frame. The present mirror is surprisingly thin, with at least 50% of the depth dimensions being less than about 3.0 centimeters.

32 Claims, 10 Drawing Sheets

REARVIEW MIRROR WITH INTEGRATED FRAME

BACKGROUND

The present invention concerns vehicle mirrors, and more particularly relates to rearview mirrors having an integrated frame.

Interior and exterior rearview mirrors of modern passenger vehicles have become heavier and heavier as more and more content and features are added. For example, many modern vehicle mirrors include several of the following options: electrochromic mirror subassemblies and circuitry to reduce glare, keyless entry sensing systems, microphone-speaker-antennae-phone communication systems, audio-control systems, compass and temperature devices and displays, lighting, switches for control of electrical circuits, and the like. Since most vehicle mirrors are supported from one side (usually a back or topside), this added weight creates a pendulum effect that causes the mirrors to shake, vibrate, and resonate unacceptably. In order to reduce the shaking, vibration, and resonation, the rear support area on most rearview mirrors is beefed up to increase rigidity and stability, and/or reinforcement ribs are added to the rear support area. However, any increase in wall thickness and/or increase in the number of reinforcement ribs adds to part weight, adds to sinks and blemishes and other quality problems when molding the parts, and adds to part complexity. Further, the added ribs take up substantial space, making a profile of the mirrors much larger. It is desirable to provide a mirror design where the number of reinforcement ribs and webs in a mirror housing are minimized or eliminated, and where the mirror housing is primarily designed as a cosmetic covering rather than a structural member. It is noted that vehicle manufacturers have high visual standards for the housings of interior rearview mirrors, since vehicle passengers not only look at and touch the mirror housings often, but also the mirrors are in a position where every blemish and defect is easily seen.

Modern interior rearview mirrors are typically mounted from their hidden backside by an elongated mount, and are made to be angularly adjustable by a ball-and-socket connector that connects the mirror to the mount. This allows each vehicle driver to angularly adjust the mirror to an optimal position and preference. The adjustable connector is made sufficiently rigid to hold the mirror in a selected angular position, even when receiving substantial vibrational stress. However, the adjustable connectors include multiple separate parts and pieces that require assembly, and further take up space. It would be desirable to provide a mount where the ball and socket connection was better integrated into one of the mirror components.

Still another concern is wire management. Modern vehicle mirrors can have several wires connected to internal components within the mirror head. These wires need to be managed so that they do not become entangled or pinched during assembly or during angular adjustment. Further, mis-positioning of wires can cause substantial variation in electromagnetic interference and radio frequency interference emitted from power-using electrical components on the mirror, which is of increasing concern to vehicle manufacturers. It is desirable to provide a mirror having an integrated wire management system so that wires are well managed and consistently located in the mirror, and so that the wires are integrally shielded along with the electrical devices that they are connected to.

Another concern is impact testing and vehicle safety. For example, at least one vehicle manufacturer requires that the mirror glass not break or result in separation of large glass pieces from the mirror, particularly where the glass pieces are more than 2.5 mm from a crack line, since loose broken glass can be injurious to a vehicle driver or passenger. Hence, it is important that glass elements be supported in a manner that minimizes a tendency of the glass to be sharply bent and broken upon impact, and that holds the glass elements in a manner keeping broken pieces from coming loose upon impact. This problem can be complicated in an electrochromic (EC) mirror since an EC mirror has two glass elements with an EC material therebetween.

In addition to the above problems, as mirrors have become increasingly complex and sophisticated, the number of parts and pieces necessary for assembly have increased. It is desirable to provide an improvement where the many parts and pieces can be assembled in a more open physical arrangement, rather than having to be assembled into the cavity of a concave mirror housing. It is also potentially preferable that the mirror housing be designed more for "pure aesthetics", such that functional aspects are not as much of a concern.

Accordingly, an apparatus is desired having the aforementioned advantages and solving and/or making improvements on the aforementioned disadvantages.

SUMMARY OF THE PRESENT INVENTION

In one aspect of the present invention, a rearview mirror for vehicles includes an integrated plate frame, and an electrochromic mirror subassembly including at least one glass element and electrochromic material, with the subassembly being supported by the plate frame. A circuit configured to operate the electrochromic material is supported on a rear of the plate frame, and a cover is supported by the plate frame that covers at least one of the rear and edges of the plate frame.

In another aspect of the present invention, a rearview mirror for vehicles includes an internal metal structural backing plate having a flat front surface, and an electrochromic mirror subassembly. The mirror subassembly includes front and rear glass elements and electrochromic material therebetween, and is uniformly supported on the front surface of the metal backing plate for good impact resistance.

In another aspect of the present invention, a rearview mirror apparatus for vehicles includes a mirror and a mount adapted to support the mirror in a vehicle. The mirror includes an internal frame having a front surface, and an electrochromic mirror subassembly supported on the front surface. An angularly-adjustable connector adjustably supports the mirror on the mount. The angularly-adjustable connector includes a ball section and a socket-defining section, where the ball section is formed on one of the internal frame and the mount, and the socket-defining section is formed on the other of the internal frame and the mount. The socket-defining section receives and supports the ball section for angular adjustment, but engages the ball section with sufficient force and friction to hold the mirror in a selected angular position once the mirror is released by a vehicle driver.

In another aspect of the present invention, a rearview mirror for vehicles includes an internal metal plate, and an electrochromic mirror subassembly supported in front of the plate. An electrical circuit is supported on the metal plate and is operably connected to the electrochromic mirror subassembly. The metal plate has good heat conduction properties and acts as a heat sink for the circuit.

In another aspect of the present invention, a rearview mirror for vehicles includes an internal metal plate, and an electrochromic mirror subassembly supported in front of the plate. An electrical circuit is supported on the metal plate and is operably connected to the electrochromic mirror subassembly. The electrical circuit includes electrical devices that generate at least one of EMI emissions and RFI emissions, and the metal plate has an integrally-formed section shaped to at least partially cover and shield the electrical device to reduce EMI and RFI emissions.

In another aspect of the present invention, a rearview mirror for vehicles includes a mirror subassembly, and a frame supporting the mirror subassembly. A cover is attached to the frame and covers a back and edges of the mirror subassembly. The mirror subassembly forms a front surface and the cover forms a rear surface of the mirror. The front and rear surfaces include areas defining a plurality of different depth dimensions, with at least 50% of the depth dimensions being less than about 3 centimeters.

In another aspect of the present invention, a rearview mirror for vehicles includes an internal plate. A back cover is supported by the plate and covers a rear of the plate. An electrochromic mirror element is supported in front of the plate. At least one button is operably supported by the plate, and an electrical circuit is supported by the plate and is operably connected to the button for controlling an electrical feature of the vehicle.

In still another aspect of the present invention, a plate frame adapted for use in a rearview mirror for vehicles includes an internal plate frame including a smooth front surface adapted for supporting a rearview mirror element. An integrally-formed protrusion extends rearwardly from the plate, the protrusion including a stem and a ball section on an end of the stem that is adapted to form a ball-and-socket connection for angularly and adjustably supporting the internal plate and mirror elements attached to and supported by the internal plate.

In yet another aspect of the present invention, a plate frame adapted for use in a rearview mirror for vehicles includes an internal plate frame including a smooth front surface adapted for supporting a rearview mirror element. An integrally-formed tubular section extends rearwardly from the plate. Bearings form a socket in an end of the tubular section, the bearings being adapted to receive a ball section to form a ball-and-socket connection for angularly and adjustably supporting the internal plate frame and the rearview mirror element on a mirror mount having the ball section.

In another aspect of the present invention, a rearview mirror for vehicles includes an internal plate frame having a smooth front surface, a reflector layer on the front surface, an electrochromic material covering the reflector layer, and a glass element on the electrochromic material that contains the electrochromic material on the reflector layer against the front surface.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
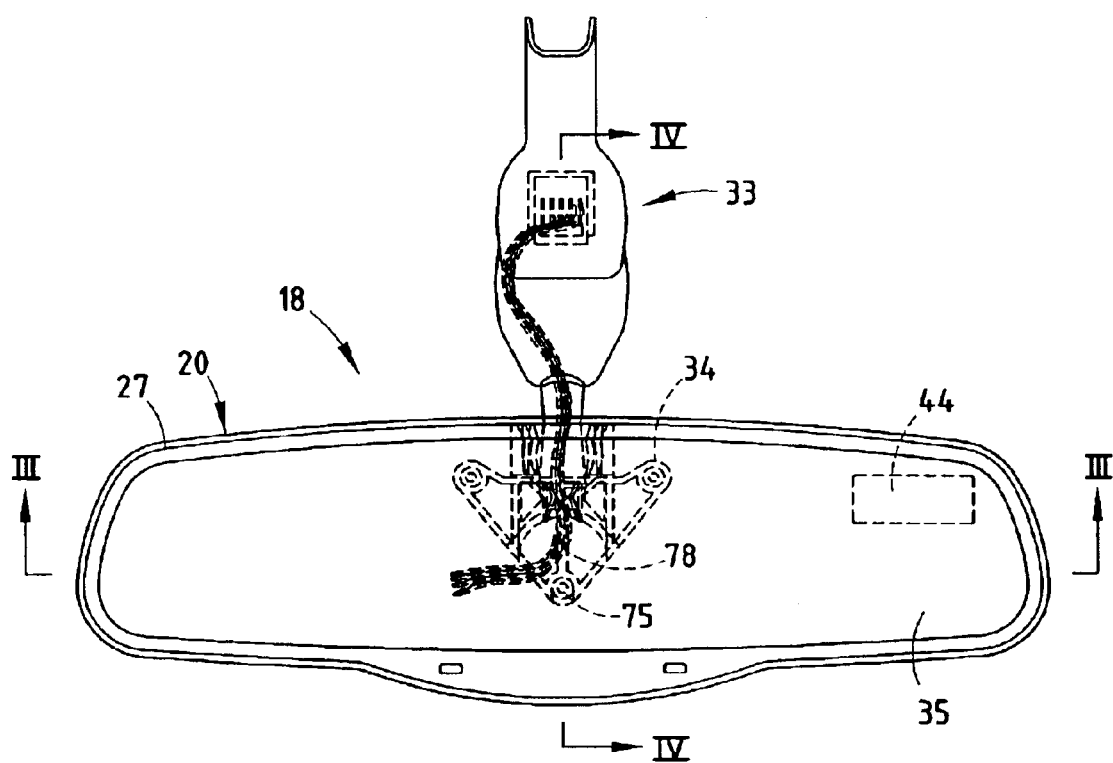
FIGS. 1–2 are front and top views of a mirror assembly embodying the present invention.

An apparatus 18 includes a mount 33 supporting an EC mirror 20 for angular adjustment (FIGS. 1–4) on the front windshield 19 of a vehicle. The electrochromic mirror 20 (FIG. 6) includes an internal plate frame 21 (FIGS. 5–6) with an electrochromic (EC) mirror subassembly 22 supported on a front surface 23 of the plate frame 21. Electrical components 24 are supported by a circuit board 40 attached to a rear surface 25 (or to the front surface 23) of the plate frame 21 with the plate frame 21 acting as a heat sink and as an EMI and/or RFI shield, as discussed below. A back cover 26 and bezel 27 are supported on a perimeter edge 28 of the plate frame 21 and cover the rear surface 25, the edge 28, and an outer edge of the EC mirror subassembly 22. In the illustrated embodiment of mirror 20, the EC mirror subassembly 22 is uniformly and continuously supported across the front surface 23 of the plate frame 21 (except at relatively small locations such as display-receiving aperture 44) for good mirror impact resistance in a vehicle crash. The mirror 20 is supported by an angularly adjustable ball-and-socket connection 30 (FIG. 6) formed by a ball section 31 on a glass-attached mount 33, and a mating socket 32 in an attachment component 34 attached directly to the plate frame 21.

In the illustrated mirror 20 (FIG. 6), the socket 32 is formed by an attachment component 34 attached directly to the plate frame 21, and the ball section 31 is formed on a mount 33. Due to the improvements associated with the plate frame 21, (and also plate frame 21A, 21B and 21C described below) including its high strength and wide reach while maintaining a minimal thickness, the present mirror 20 (and mirrors 20A–20C) is surprisingly thin, with at least 50% of the depth dimension D1 (FIG. 3) being less than about 3 centimeters, and at least 50% of the depth dimensions being less than 15% of the maximum width dimension W1. More preferably, at least about 50% of the depth dimensions are less than about 3.0 cm, and also are less than about 12% of a maximum width dimension. Further, it is estimated that a weight of the mirror head can be reduced by 10%–20% (see FIG. 5, the mirror head including the attachment component 34 but not including the ball section 31) and can be reduced by as much as by 30%–40% (see FIGS. 7–10, the mirror head including a metal plate with an integrally formed ball section with wireway hole therethrough but not including the mount with socket-forming bushings and coil spring). The present arrangement takes maximum advantage of the high strength internal frame 21 and the lightweight cover 26 (as opposed to a much heavier plastic rear housing with stiffening ribs around the pivotal-adjusting connection area) and further reduces a tendency of the mirror 20 to vibrate since there is a lower pendulum effect. Specifically, the mirror 20 has a center of gravity closer to the ball-and-socket connection, due to the thinner total mirror thickness, and has a reduced pendulum effect due to its lighter weight.

It is noted that the integrated plate frame 21 can be made from a variety of different metals and also potentially can be made from some composite materials that are capable of maintaining a very flat front surface for supporting the glass. Thermal expansion is important to maintaining flatness under the widely varying temperatures often seen in vehicle passenger compartments. In particular, plate frame materials having a thermal expansion close to the thermal expansion of glass have less tendency to create bowing and localized surface distortions, since there are less stresses developed due to dissimilar thermal expansions. For example, it has been found that steel will work well for plate frame 21, since glass has a thermal expansion of about $4.5 \times 10^{-6}$ in/in/° F. (8.0 mm/mm/° K), while steel has a thermal expansion of about $6.5 \times 10^{-6}$ in/in/° F. (11.5.0 mm/mm/° K). Alternatively, magnesium has a thermal expansion of about $13.8 \times 10^{-6}$ in/in/° F. (24.5 mm/mm/° K), while aluminum has a thermal expansion of about $13.0 \times 10^{-6}$ in/in/° F. (23.9 mm/mm/° K), and ABS/PC plastic has a thermal expansion of about $40 \times 10^{-6}$ in/in/° F. (71 mm/mm° K), Nonetheless, it is noted that each of these materials can be used in combination with the present inventive concepts to produce a mirror having beneficial aspects where the plate frame design is modified to accommodate the dissimilar thermal expansion.

A brief discussion follows that is sufficient to provide an understanding of the present invention to persons skilled in this art. Nonetheless, it is noted that electrochromic mirror subassemblies, such as EC subassembly 22, are generally well known in the art. Thus, a detailed description is not necessary to provide an understanding of the present invention to a person skilled in this art. Further, though a particular EC mirror subassembly is shown, it is specifically contemplated that the present inventive concepts will work on many such EC mirror subassemblies.

Briefly, the illustrated EC subassembly 22 (FIG. 5) includes front and rear glass elements 35 and 36, with a layer of electrochromic (EC) material 37 between. Top and bottom electrical conductors 35' and 36' (FIG. 6) are connected to opposing sides of the EC material 37 and are operably connected to a control circuit 41 on a circuit board 40, described below.

The reflective layer 38 is located either on the front surface of the rear glass element 36 (called a third surface reflector) or on the rear surface of the rear glass element 36 (called a fourth surface reflector). In the present arrangement, there is a double-sided tape 39 adhering a rear of the EC mirror subassembly 22 to the front surface 23 of plate frame 21. It is contemplated that other attachment means could be used instead of adhesive tape, such as a layer of adhesive. Alternatively, mechanical edge connectors (such as tabs or resilient fingers) near edges of the plate frame 21 could be used to retain the EC subassembly 22 to the plate frame 21 in a multi-layer arrangement permitting some lateral slippage of the EC subassembly 22 on the plate frame 21. It is contemplated that the EC subassembly 22 could also be retained to the plate frame 21 by the bezel 27. Alternatively, it is conceived that the reflective layer 38 can be formed directly on a front surface of the internal plate frame 21 as a third surface reflector, and the second glass element 36 eliminated.

The illustrated plate frame 21 is preferably made from a stiff, strong material (such as steel or magnesium) having a high strength-to-weight ratio, is dimensionally very stable, and further has properties allowing it to be made with a very uniform and consistently flat surface. The magnesium material has a thermal expansion rate of about $13.8 \times 10^{-6}$ in/in/° F. (24.5 mm/mm/° K), which, based on testing, is similar enough to the thermal expansion of glass to provide a stable arrangement satisfactory for many automotive applications. However, it is noted that other metals, such as steel, has thermal expansion properties closer to glass. In particular, steel has a thermal expansion of about $6.5 \times 10^{-6}$ in/in/° F. (11.5.0 mm/mm° K), which is relatively close to the thermal expansion of about $4.5 \times 10^{-6}$ in/in/° F. (8.0 mm/mm/° K) for glass.

Where the thermal expansion of such materials is not as well matched to glass, care must be used in attaching the EC subassembly 21 to the plate frame to minimize stress during assembly and to avoid unacceptable distortions and non-uniform stress in the glass elements 35 and 36, since such distortions can result in buckling or cracking of the glass and/or distortion of reflected images. The fluidity and tackiness of the adhesive tape 39 can also be important in reducing or distributing stress, including stress from thermal expansion or contraction. Also, the thickness of the glass elements is important in preventing distortion of reflected images. For example, by using magnesium or steel, it has been found that a thickness of the rear glass element 36 can be reduced from the more normal glass thickness of about 2.2+ mm, to a reduced glass thickness as low as about 1.6 mm, and potentially even as low as 1.1 mm, and the front glass element 35 can be reduced in thickness to about 1.6 mm or even lower, depending upon functional considerations of the mirror design. When aluminum is used, it is conceived that the thickness of plate frame 21 itself can be reduced to a surprisingly thin dimension, such as about 1.0 to 1.5 mm thick. When die-cast grade magnesium is used, it is conceived that the thickness of plate frame 21 can be reduced even more, such as to about 1.0 mm or less. Also, apertures can be cut into the plate frame to further reduce weight, with the apertures having a size sufficiently small enough to allow the glass elements of the mirror subassembly to span the apertures without distortion.

The electrical components 24 (FIG. 6) are mounted on a circuit board(s) 40 and are interconnected to each other to form an electrical circuit 41 operably connected to the EC material 37 for darkening the EC material 37 to reduce a reflection of glaring headlights of vehicles following the vehicle of mirror assembly 20. The electrical control circuit 41 includes wires 42 that connect to a vehicle wiring harness that extends from the mount 33 up and along the vehicle roof and down the vehicle's "A" pillar to the vehicle's electrical system.

Figure 5:
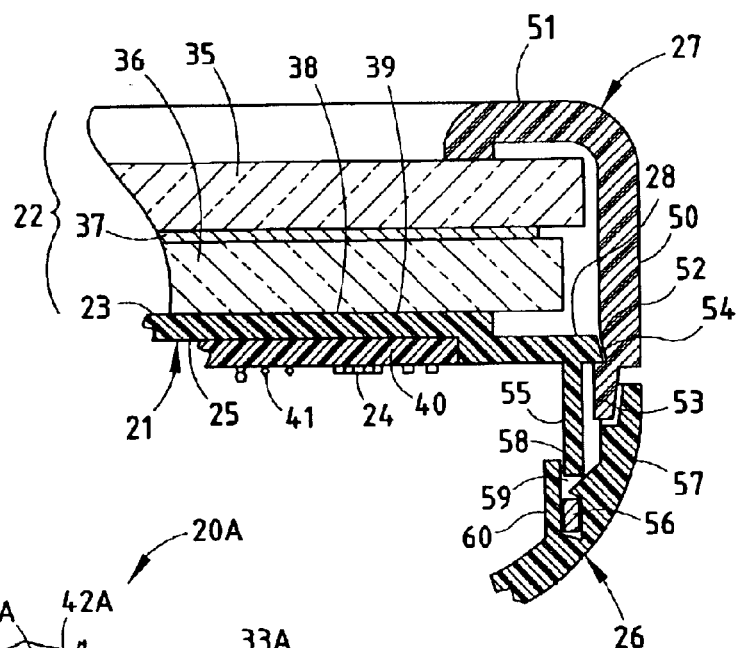
FIG. 5 is an enlargement of the circled area V in FIG. 3.
Figure 6:
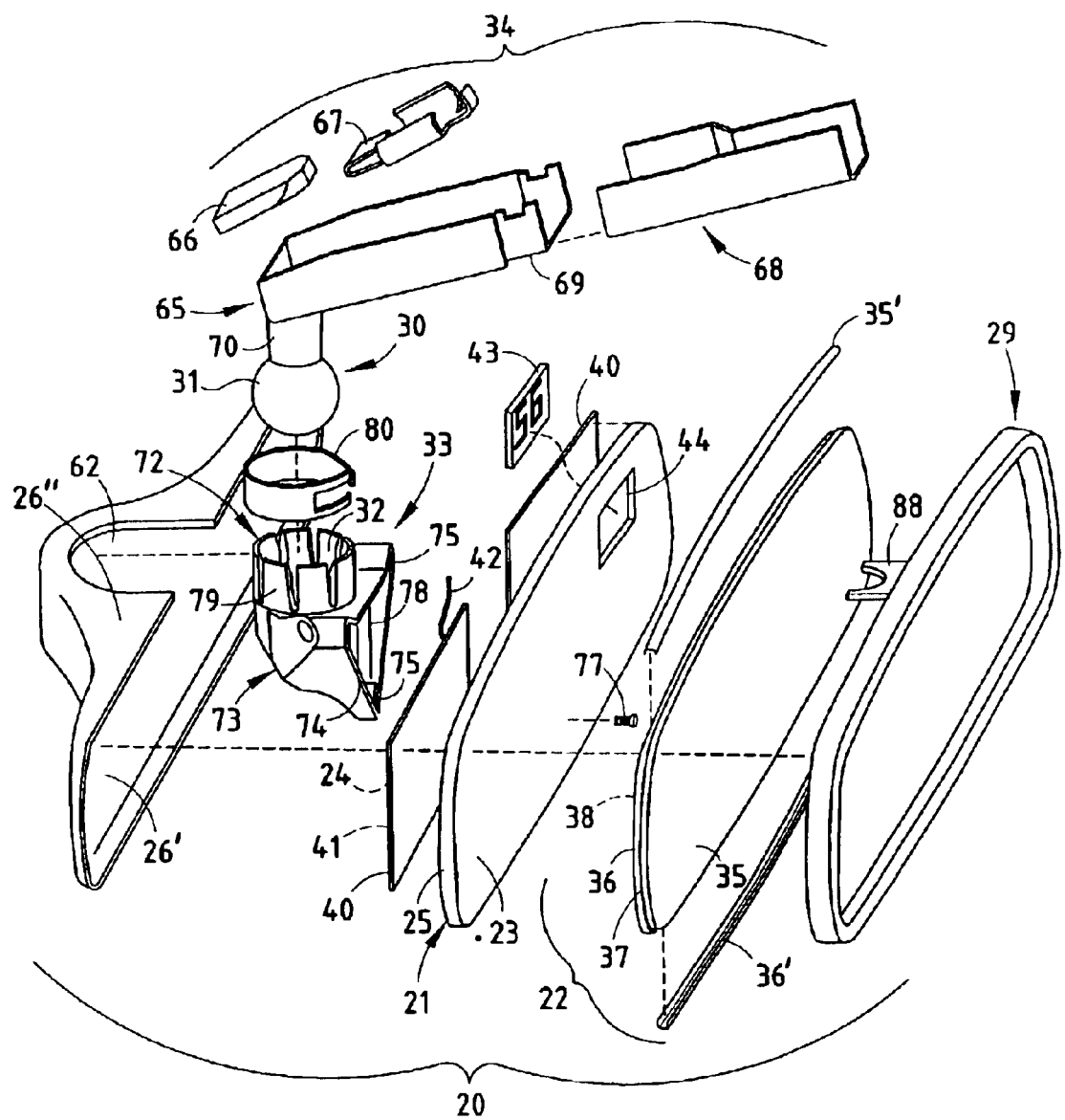
FIG. 6 is an exploded perspective view of the mirror in FIGS. 1–4.

The plate frame 21 (FIG. 6) (also called an internal, integrated frame) is made of metal such as magnesium, which is particularly strong and dimensionally accurate. The plate frame 21 is sufficiently strong to be the primary support for mirror 20. The EC mirror subassembly 22 is attached to a front surface of the plate frame by a double-sided adhesive tape 39 (FIG. 5). A compass and temperature display 43 can be added, which fits into an aperture/pocket 44 in a face of the plate frame 21. The illustrated pocket 44 extends completely through the plate frame 21, but it is contemplated that it could instead be a recess that extends only partially into the plate frame 21. Circuit boards 40 include edges or tabs that are frictionally attached or that are heat staked onto the rear surface of the plate frame 21, and carry components such as diodes, lights, displays, switches, and other components 24. Alternatively, components such as diodes, lights, LEDs, displays, displays, switches, and the like can also be mounted directly on the plate frame 21, either on the front or rear surfaces 23 and 25, or in recesses or apertures in the front or rear of the plate frame 21. Advantageously, the plate frame 21 is thermally conductive, and acts as a very good heat sink for power-using components of the EC control circuit 41 and for heat generating components such as diodes, light sources, LED and the like. Also, the plate frame 21 is an excellent shield against electromagnetic interference (EMI) and radio frequency interference (RFI). Thus, the plate frame 21 acts as an excellent shield where wire management channels and apertures are provided and the wires are well managed tightly against a rear surface of the mirror subassembly, or where tabs are formed to partially encase the component. (See FIGS. 7–10.)

Since the plate frame 21 is the main structural member that carries a load of the mirror 20, the cover 26 is merely an aesthetic enclosure hung on the plate frame 21. Accordingly, the cover 26 no longer requires the ribs and thickness required of traditional mirror housings, especially around the mounting area near the ball-and-socket connection 30. Instead, the cover 26 can thus be nothing more than a cover. This has great advantages, since the cover 26 can be made thinner, lighter, and from less expensive plastic. Further, molding of the cover 26 is simplified and quality improved over prior housings, since the stiffening ribs and webs around the socket area are eliminated. (In prior art, the stiffening ribs and webs were a quality problem, since they tend to cause molding problems including sinks and visible marks on an outside of the housing. Further, the ribs and webs made the mold tooling much more expensive and difficult to maintain.)

Bezel 27 (FIG. 5) extends around a perimeter of the EC mirror subassembly 22, and has a J-shaped cross section. The J-shaped cross section includes a straight side section 50 spaced from an edge of the glass elements 35 and 36, and a front arching section 51 with an end that curls around and engages the front surface of the front glass element 35 slightly inboard of an edge of the glass element 35. The side section 50 includes a configured trailing end with a notch 52 shaped to engage a tip 54 of the plate frame 21, and a tapered end 53.

The outer perimeter edge of the plate frame 21 includes the tip 54 that engages notch 52, and further includes a rearward-extending perimeter lip 55 forming a recess on a rear side of the plate frame 21 for receiving the circuit board 40. Bosses 55' and/or stand-offs and/or tabs are located on a rear of the plate frame 21 for attachment of items to the plate frame 21. For example, the bosses 55' receive screws to securely attach the attachment component 34 to the plate frame 21. The plate frame 21 still further includes a rearward extending attachment flange 56. The cover 26 includes an outboard flange 57 that overlaps the tapered end 53 of the bezel 27. The illustrated outboard flange 57 of the cover 26 is spaced from and does not engage or press on the bezel side section 50 (and notch 52). Instead, there is a gap formed therebetween so that there is no risk of squeaking or rattling. However, it is contemplated that the overlap could be constructed so that the outboard flange 57 presses on the bezel side section 50 to maintain engagement of the tip 54 of the plate frame 21 with the notch 52. The outboard flange 57 on the cover 26 includes an inwardly extending protrusion 58 that engages an aperture 59 on the attachment flange 56 of the plate frame 21. A second attachment flange 60 on the cover 26, which lies parallel and inboard of the flange 56, engages an inside surface of the attachment flange 56 and helps keep the protrusion 58 in secure attachment with the aperture 59.

The cover 26 includes a relatively thin rear wall 26' of uniform thickness, with minimal reinforcement ribs and webs, since they are not needed for structure. A perimeter wall 26" (FIG. 6) extends forwardly from the rear wall 26' to define a concave shape. A top portion of the perimeter wall 26 includes a forwardly open slot 62 for receiving the ball-and-socket connection 30.

There are a variety of different mounts that can be used to hold the present mirror 20, including single and double ball-and-socket mounts. The illustrated mount 33 (FIG. 6) includes an injection-molded or die-cast base 65 adapted for connection to a window-adhered bracket 66 via a clip 67 on the base 65. The clip 67 engages opposing sides of the bracket 66. A tunnel cover 68 telescopingly attaches to a top flange 69 of the base 65 for covering wires 42 extending from the mirror 20 up through attachment component 34 and base 65 to a location above a vehicle headliner. The base 65 includes reinforcement ribs and webs to secure a down stem 70, which stem 70 supports the ball section 31. A wireway is formed through the ball section 31 and stem 70 for routing wires from the mirror 20 (or, alternatively, the wires can be routed parallel and above the stem 70 in a semi-hidden position).

The attachment component 34 (FIG. 6) includes a crown section 72 and an attachment section 73. The attachment section 73 includes a triangularly-shaped flat side 74 shaped for stably engaging a rear surface of the plate frame 21. Three apertured bosses 75 on the attachment section 73 align with three apertured bosses 76 in the plate frame 21, for receiving screws 77 to secure the plate frame 21 to the attachment section 73. The attachment section 73 is generally hollow to facilitate molding, but includes one or more reinforcement ribs 78 that stiffen and strengthen the attachment section 73. The illustrated component 34 includes a wireway passage that extends laterally through the attachment component 34 and upwardly through a center of the crown section 72. The crown section 72 includes a plurality of resilient protrusions 79 that extend upwardly, and that have outer surfaces forming a cylinder for receiving a hoop clamp 80, and that have inner surfaces forming a socket 32 for receiving the ball section 31. As the ball section 31 is extended downwardly into the socket 32, the protrusions 79 flex outward and then return to their inward positions. Thereafter, the clamp 80 is applied, holding the protrusions 79 snugly against the ball section 31 for adequate static friction to hold a selected position, but with sufficient controlled force to permit angular adjustment. It is noted that the ball section 31 and stem 70 could be designed to extend rearwardly, instead of downwardly.

It is noted that the bezel 27 (FIG. 6) includes a rearwardly extending tab 82 that closes a front portion of the slot 62 in a top of the cover 26.

Figure 2:
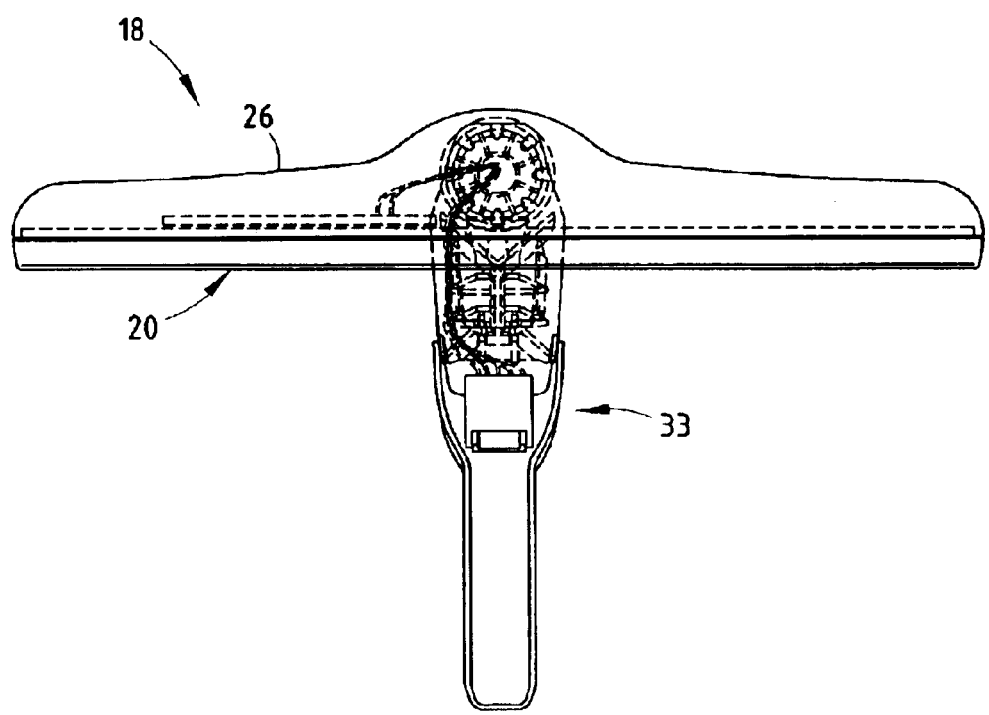
Figure 2A:
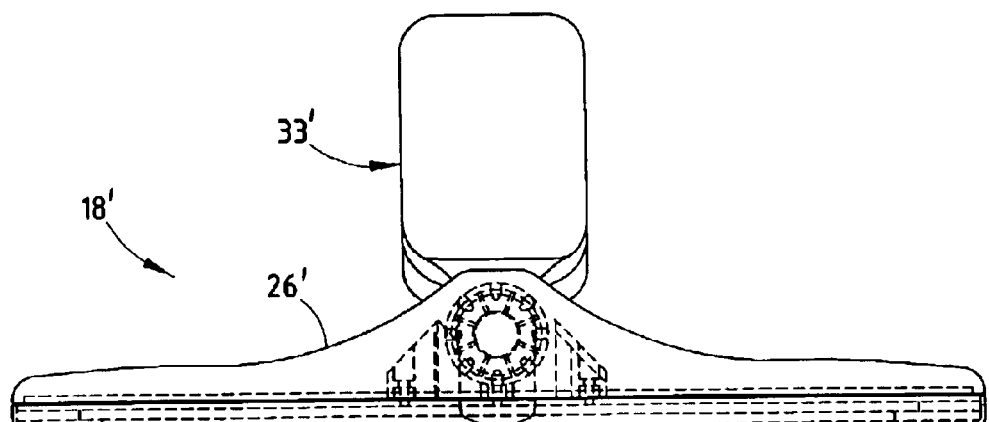
FIG. 2A is similar to FIG. 2 but showing a thinner mirror assembly.
Figure 3:
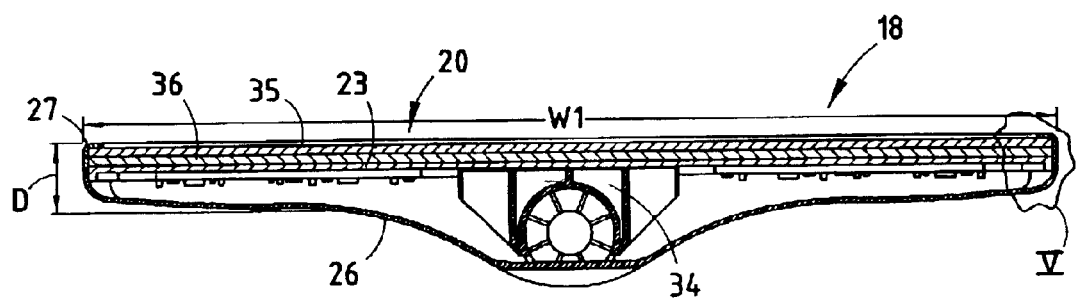
FIGS. 3–4 are cross-sectional views taken along the lines III—III and IV—IV in FIG. 1.
Figure 4:
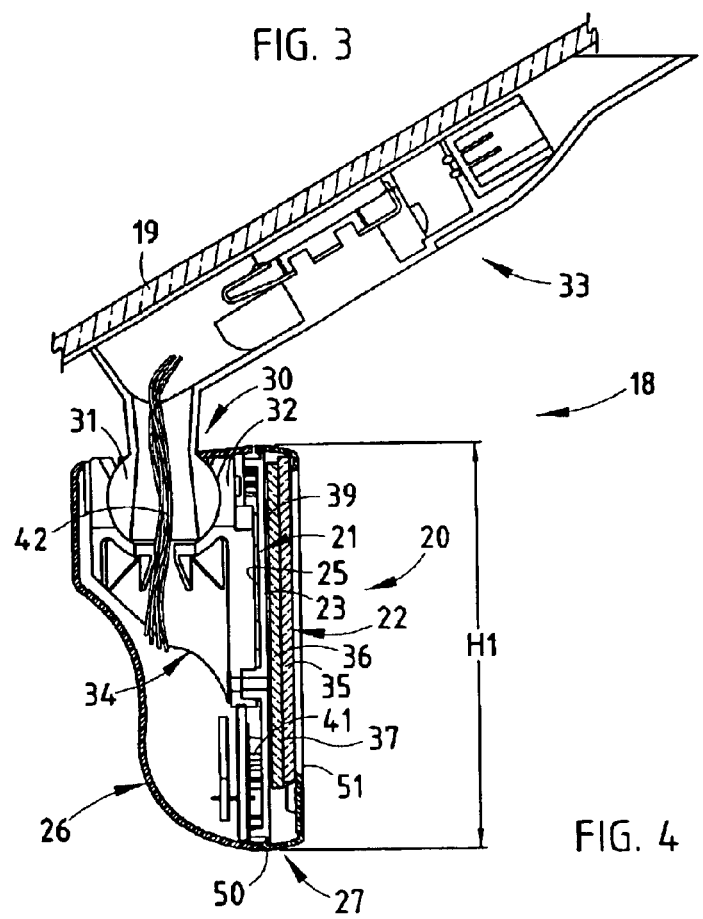

Mirror 20' (FIG. 2A) is similar to mirror 20 (FIG. 2), except that mirror subassembly 20' includes back cover 26' are 30% thinner in depth. (The front profile of the mirror subassembly 20' and its internal components are basically the same as mirror 20.) Also, the mount 33' of the apparatus 18' has a different shape.

The mirrors shown in FIGS. 7–29 are similar to but are modified from the mirror 20. Features and characteristics on the mirrors that are identical or similar to mirror 20 are identified using identical numbers along with the letters "A", "B", etc., respectively, to reduce redundant discussion.

Figure 7:
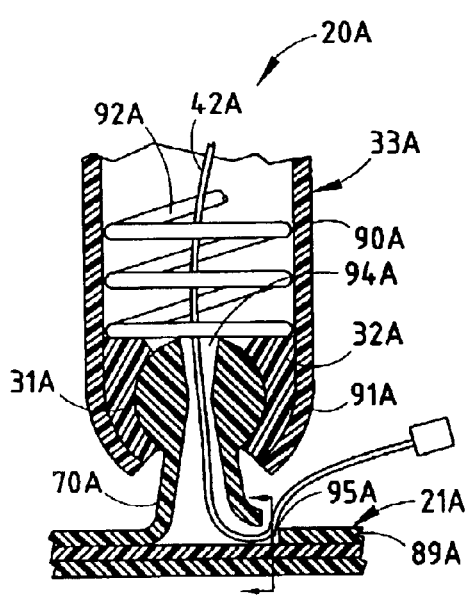
FIG. 7 is a fragmentary cross-sectional view taken horizontally through a center of a first modified mirror assembly.
Figure 8:
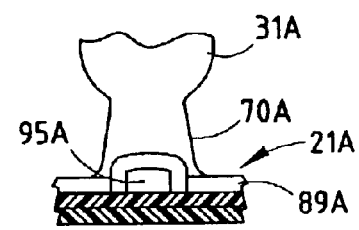
FIG. 8 is a cross-sectional view taken along the line VIII—VIII in FIG. 7.
Figure 9:
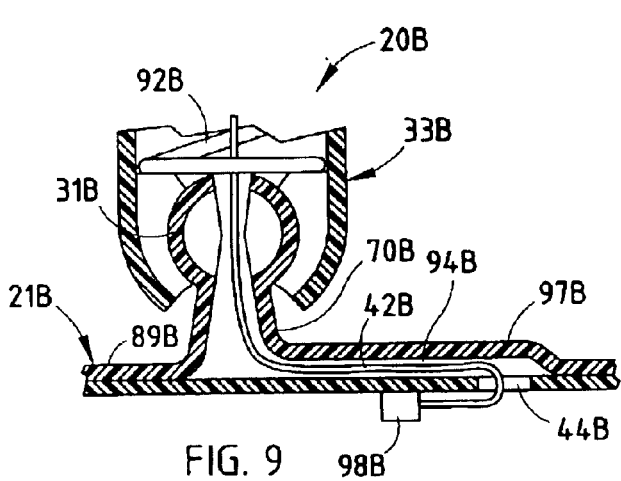
FIG. 9 is a fragmentary cross-sectional view similar to FIG. 7 but of a second modified mirror assembly.

In the illustrated mirror 20, the socket 32 is formed by an attachment component 34 that is attached directly to the plate frame 21, and the socket 32 is formed on a mount 33. In a second embodiment of FIGS. 7–8, the plate frame 21A of a mirror 20A includes a ball section 31A and stem 70A formed integrally from the material of the plate frame 21A (FIGS. 7–9). The ball section 31A and stem 70A extend rearward from the plate frame 21. It is noted that several different materials may be used to form the plate frame 21A with integral ball section 31A and stem 70A, such as magnesium, aluminum, and deep draw steels and even potentially a strong, stiff plastic or composite.

The mirror 20A (FIGS. 7–8) includes a plate frame 21A attached to a mount 33A. The illustrated plate frame 21A is a die-cast magnesium part, with an integrally formed stem 70A and ball section 31A integrally cast onto a back side of the plate portion 89A of the plate frame 21A. The mount 33A includes a tube 90A with a formed end 91A holding socket-forming bearings 32A against the ball section 31A. A coil spring 92A biases the bearings 32A against the end 91A. It is contemplated that mount 33A can be a one-ball mount, with the ball-and-socket connection 30A being only at a single end, or can be a two-ball mount, with a ball-and-socket connection at each end. The illustrated stem 70A and ball section 31A have a wireway/passageway 94A formed therethrough for passing wires 42A from the mirror 20A to the mount 33A. A lateral opening 95A is formed at a root of the stem 70A, slightly above the plate portion 89A of the plate frame 21A. The opening permits wires 42A to be passed out a side of the stem 70A to locations optimally suited for attachment to electrical components 24 and circuit 41. It is contemplated that the passageway 94A can be a hole requiring feed-through of wires 42A, or can be an open channel with an overhanging side flange permitting lay-in of wires 42A (with the overhanging flange both helping to contain the wires and also shield any EMI or RFI emissions).

Mirror 20B (FIG. 9) includes a plate frame 21B made from a sheet of a deep-draw steel. The stem 70B and ball section 31B are formed from the material of the plate portion 89B of the plate frame 21B. A shielding tunnel or channel 97B is formed on a face of the plate portion 89B for managing wires 42B as the wires 42B pass from the passageway 94B along the channel 97B and through the aperture 44B. The channel 97B can be formed under the second mirror element 36, with the mirror element 36 bridging over the channel 97B. Alternatively, the channel 97B can be formed in a chin area of the mirror 20B, below the EC mirror subassembly 22B, where the electrical connector or device 98B does not interfere with the glass elements of the EC mirror subassembly 22B. For example, the device 98B could be a button on the "chin" area of a mirror assembly 20B. Alternatively, a channel (not unlike channel 97B) can be formed on a side of the plate portion 89B for communicating wires 42B along a side of the plate portion 89B. Notably, the channel 97B is large enough to carry the wires 42B without a tight fit, but the access opening to the channel 97B is sufficiently small such that the elements 36 of the EC mirror subassembly 22B can span the access opening without distortion as they bridge the access opening.

Figure 10:
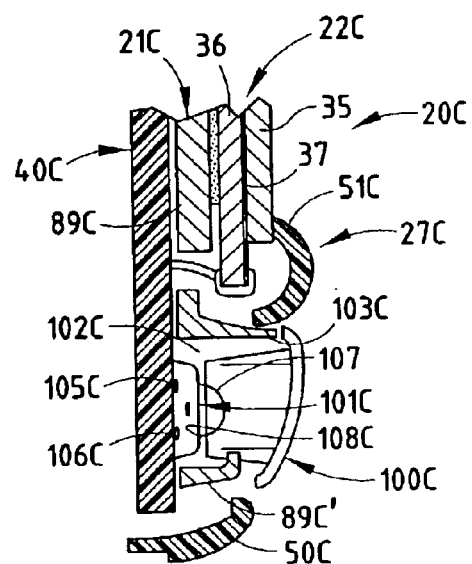
FIG. 10 is a vertical cross-sectional view taken vertically through a third modified mirror assembly, including a button and switch operably positioned on the plate frame.

Mirror 20C (FIG. 10) includes a plate frame 21C and a circuit board 40C, with buttons 100C and switches 101C operably mounted directly onto and into the plate frame 21C and the circuit board 40C. FIG. 10 is a vertical cross section taken through a lower central "chin" area on the mirror 20C. The vertical cross section passes through the button 100C and shows each of the plate frame 21C, the circuit board 40C, the bezel 27C, the button 100C, and the components of the switch 101C. The lower portion 89C of the plate portion 89C of the plate frame 21C includes an aperture 102C for receiving the button 100C, and further includes a forward rib 103C. The rib 103C includes a tip that forms a top pivot/guide for the button 100C and further includes a bottom tip that forms a stop that engages the button 100C for limiting the maximum depth of movement of the button 100C when the button 100C is depressed. The rib 103C also promotes a better and more consistent gap and appearance around the button 100C. Alternatively, it is contemplated that the rib 103C and lower portion 89C' can be components separate from the plate frame 21C. In such case, they would be attached to and supported on the circuit board 40C or attached to and supported on the bezel 27C.

Two electrical contacts 105C and 106C are positioned on the circuit board 40C and connected to the electrical control circuit 41C on the circuit board 40C. A patch of resilient film 107C is positioned over the electrical contacts 105C and 106C, and an electrically conductive member 108C is attached under the patch 107C in a position where it will electrically connect the contacts 105C and 106C when the switch 101C is made. The button 100C is positioned over the patch of film 107C. When the button 100C is depressed, the button 100C depresses film 107C and moves the conductive member 108C into operative contact with the contacts 105C and 106C, completing the circuit for operating whatever electrical device is connected to the electrical contacts 105C and 106C. When the button 100C is released, the resilient patch of film 107C biasingly moves the button 100C back to an at-rest position, where the conductive member 108C disconnects from the contacts 105C and 106C and breaks the circuit.

Though mirrors 20–20C are flat mirrors, it is contemplated that the present arrangement could be used in non-flat mirrors and aspheric mirrors. Such mirrors are often used in Europe. Such mirrors have glass elements that are bent or dished. Thus, reflected images seen in the mirror are reduced in size, but a larger viewing area is visible.

Figure 11:
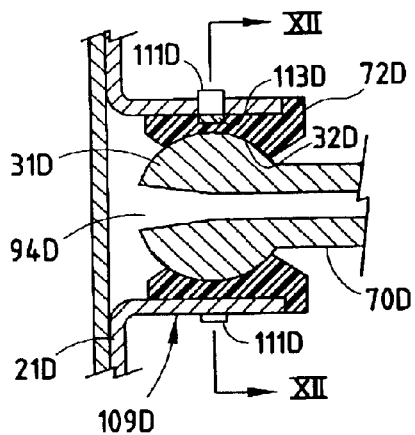
FIGS. 11–13 are a fragmentary side view, a cross section, and a fragmentary side view of alternative plate frames, where the plate frames include a tube, a ball and a socket to form a ball-and-socket connection, FIG. 12 being a cross section taken along line XII—XII in FIG. 11.
Figure 12:
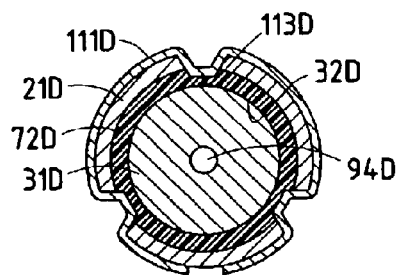
Figure 13:
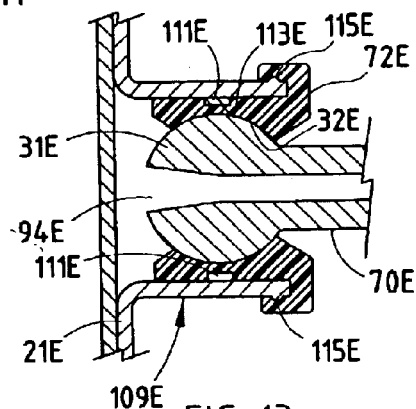

In the embodiment of FIG. 11, a mirror 20D includes an internal plate frame 21D having a tubular section 109D integrally formed thereon that extends rearwardly. The tubular section 109D includes longitudinally extending grooves 110D, three such grooves being illustrated. A crown-shaped bearing 72D defines a socket 32D for receiving a ball section 31D. An annular spring 111D extends around the tube section 109D and includes inwardly extending sections 112D (FIG. 12) that extend into the grooves 110D in the tube section and into grooves 113D in the crown bearing 72D, to retain the crown bearing 72D in place. Thus, the ball section 31D engages the socket 32D in the crown bearing 72D to form an angularly adjustable ball and socket connection. A hole 94D extends through the stem 70D and through the ball section 31D to allow wire passage.

In the mirror arrangement 20E (FIG. 13), the plate frame 21E includes a tube section 109E similar to tube section 109D (FIG. 11). However, an end of the tube section 109E includes an annular ridge or a plurality of protrusions or detents 115E that extends outwardly. The crown 72E includes an inner portion 116E that forms the socket 32E. A spring 111E wraps around the crown and biases the inner sections 116E inwardly against the ball section 31E. An annular trailing flange 117E on the crown 72E extends from the inner portion 116E around the end of the tube section 109E. The annular reversed flange 117E includes a recess that mateably snap-lockingly engages the detent 115E to retain the crown bearing 72E in position. The stem sections 70E extend from the ball section 31E and integrally connects to a mount for attachment to a vehicle windshield.

Mirror 20F (FIGS. 14–19) discloses a complete mirror having a construction similar to mirror 20A and 20B. In particular, we note the plate frame 21F that incorporates an elongated tunnel 97F forming a shield for wires 42F. Notably, the shield 97F further includes an enlarged tab 97F' that partially shields a circuit board 98F. Also, the button 100F (FIG. 19) includes a switch 101F mounted on a circuit board 98F and that is operable by button 100F under the mirror subassembly 22F and through a hole 21F' in the integrated plate frame 21F. A bezel 50F extends around the arrangement and includes a lip 50F' that snappingly engages an end 54F of the plate frame 21F to retain the bezel in position. The back cover 26F also includes a front edge 26F' that engages the edge of the plate frame 21F to retain the back cover in position, such as by a similar snap-attach connection.

Figure 23:
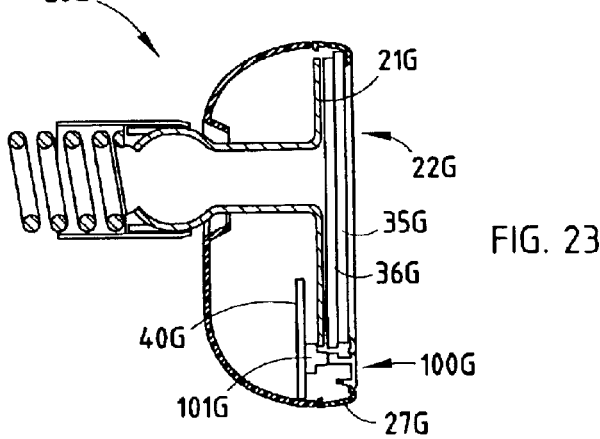
Figure 24:
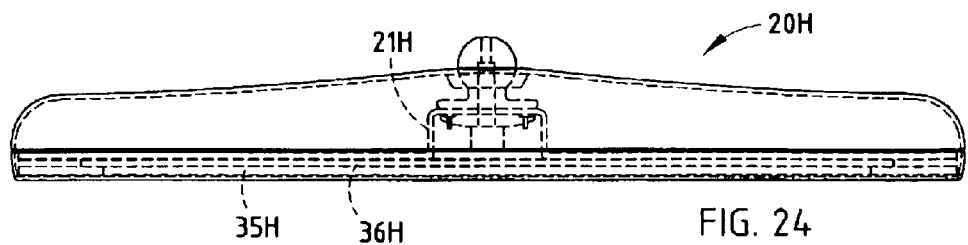
FIGS. 24–25 are top and front views of another mirror embodying the present invention.

Mirror 20G (FIGS. 20–23) includes a mirror arrangement similar to the integrally formed ball section and stem of the plate frame 21A of mirror 20A (FIG. 7), however, the ball section 31G and stem 70G are formed from a deep-draw material that is flowed and formed into the tube section 70G and ball section 31G to have a constant thin wall. Also, the tunnel shield 97G (FIG. 22) is formed on a backside of the plate frame 21G and further an aperture or hole 95G is formed in a base or root of the stem 70G for egress and entrance of wiring. Still further, a button arrangement 100G (FIG. 23) is formed along a lower central edge of the mirror in a chin area similar to mirror 20G (FIG. 23). The illustrated button 100G is operably supported on the bezel 27G, and the switch 101G is supported on the circuit board 40G.

The mirror 20H (FIGS. 24–29) includes a plate frame 21H (FIG. 26), an electrochromic mirror subassembly 22H supported on the plate frame 21H, and a bezel 27H and back cover 26H. The plate frame 21H includes a cup-shaped mount 120H including a flat wall 121H formed from the material of plate portion 89H of plate frame 21H. A connection member 122H includes a flat base 123H that engage wall 121H, a stem 124H, and a ball section 31H. A washer 125H is positioned under the flat section 121H with the base 123H opposite the washer 125H. A screw 126H includes a head 127H positioned within the cup-shaped member 121H, and includes a threaded shaft 127H' that extends through a hole in the washer 125H, through a hole in the flat wall 121H, and threadably into a hole that extends up through stem 124H into ball section 31H. The screw 126H includes a length that extends substantially into the ball section 31H. However, it is contemplated that the shaft length of the screw 126H can be significantly shorter. Further, the hole can be extended through the ball section 31H and connected to a passageway formed laterally out of a side of the stem 124H. Thus, a wire passageway can be formed to communicate wires centrally through the ball section 31H into the stem 124H and out a side of the stem under the cover 26H into a backside of the plate frame 21H for connection to circuitry within the mirror.

It is contemplated that the present inventive concepts can be used in combination with mirrors (interior and/or exterior) having many different options to create synergistic and non-obvious combinations that provide surprising and unexpected benefits not previously possible. For example, turning now to FIG. 30, an interior mirror assembly 502 includes a bezel 555 and a case 556 mounted on an internal frame 621 (FIG. 31). The bezel and the case combine to define a mirror housing for incorporation of features in addition to a reflective element and information display. Commonly assigned U.S. Pat. Nos. 6,102,546; D 410,607; 6,407,468; 6,420,800; and 6,471,362, the disclosures of which are incorporated in their entireties herein by reference, describe various bezels, cases, and associated button construction for use with the present invention.

Figure 30:
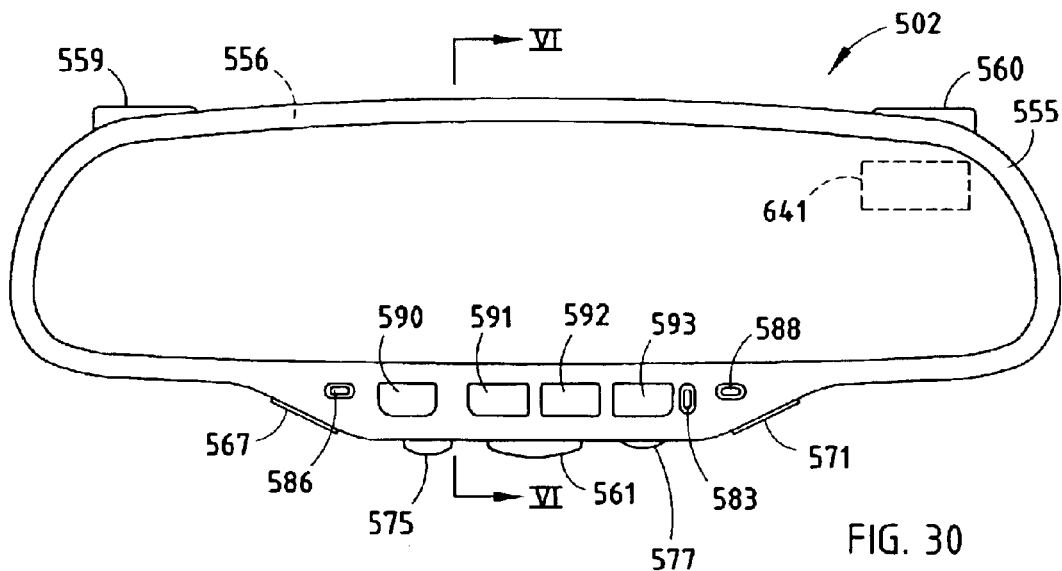
FIGS. 30–32 are front, cross section, and exploded perspective views of additional mirrors embodying aspects of the present invention.
Figure 31:
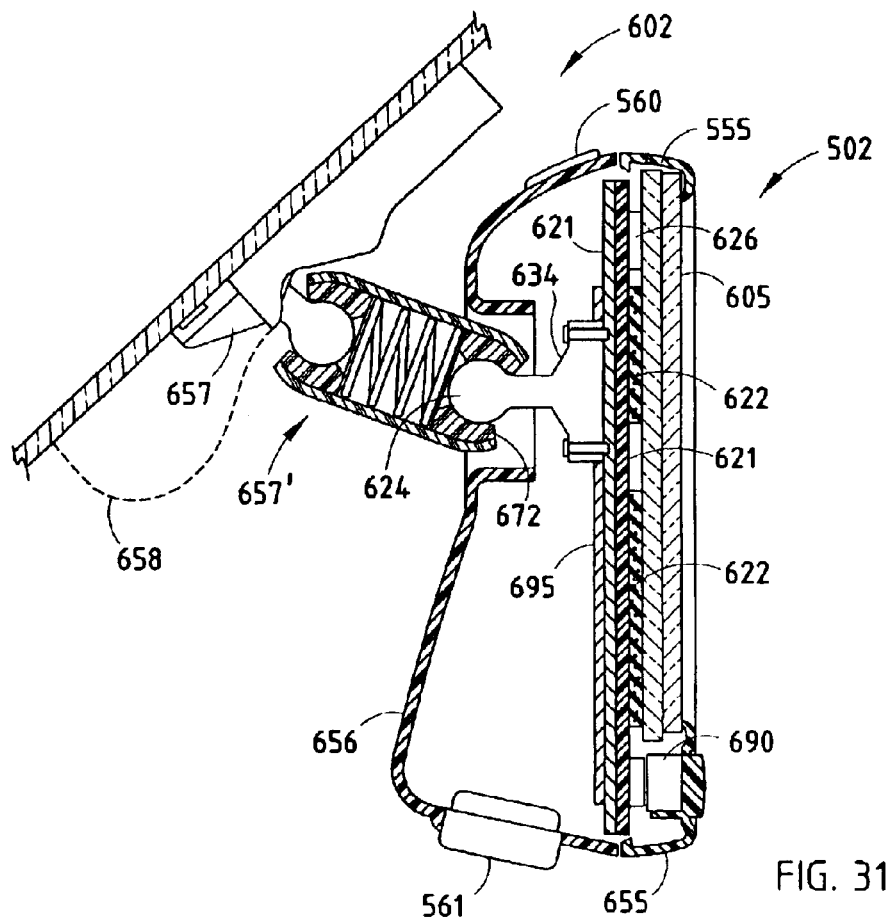
Figure 32:
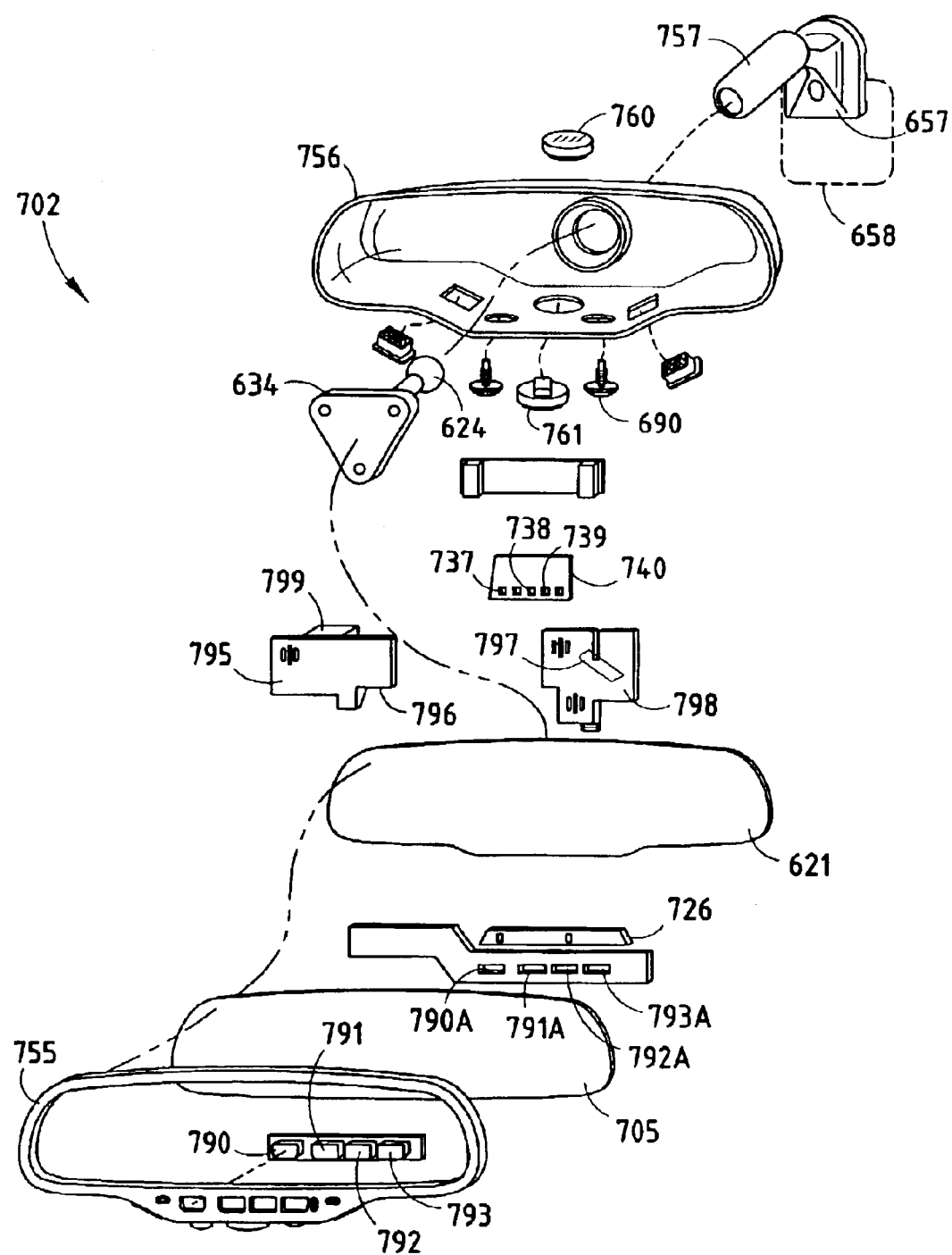

As depicted in FIG. 30, the mirror assembly may include top and/or bottom microphones 559. Examples of microphones for use with the present invention are described in commonly assigned U.S. Pat. Nos. 5,988,935 and 6,882,734, the disclosures of which are incorporated in their entireties herein by reference. As depicted in FIGS. 30–32, the microphone 561 or microphones 560 may be mounted on the top of the mirror assembly, on the bottom of the mirror assembly, on the backside of the mirror case, or anywhere within the mirror case or bezel. Preferably, two microphones are incorporated, one near each end, into the mirror assembly on the backside of the mirror case within recessed portion as shown in FIGS. 30–32. These systems may be integrated, at least in part, in a common control with information displays and/or may share components with the information displays. In addition, the status of these systems and/or the devices controlled thereby may be displayed on the associated information displays.

With further reference to FIG. 30, mirror assembly 502 includes first and second illumination assemblies 567, 571. Various illumination assemblies and illuminators for use with the present invention are described in commonly assigned U.S. Pat. Nos. 5,803,579 and 6,335,548, as well as commonly assigned U.S. patent application Ser. No. 09/835,278, the disclosures of which are incorporated in their entireties herein by reference. As further depicted in FIG. 32, each illumination assembly preferably comprises a reflector, a lens, and an illuminator (not shown). Most preferably, there are two illumination assemblies, with one generally positioned to illuminate a driver seat area. There may be only one or may be additional illuminator assemblies, such as one to illuminate a center console area, overhead console area or an area between the front seats.

With further reference to FIG. 30, mirror assembly 502 includes first and second switches 575, 577. Suitable switches for use with the present invention are described in detail in commonly assigned U.S. Pat. Nos. 6,407,468; 6,420,800; 6,471,362; and 6,6,4,579, the disclosures of which are incorporated in their entireties herein by reference. These switches may be incorporated to control the illumination assemblies, the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using the switches.

With further reference to FIG. 30, mirror assembly 502 includes indicators 583. Various indicators for use with the present invention are described in commonly assigned U.S. Pat. Nos. 5,803,579; 6,335,548;S. 6,335,548; and 6,521,916, the disclosures of which are incorporated in their entireties herein by reference. These indicators may indicate the status of the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may have a status depicted by the indicators.

With further reference to FIG. 30, mirror assembly 502 includes first and second light sensors 586, 588 (glare and ambient sensors in FIG. 7). Preferred light sensors for use within the present invention are described in detail in commonly assigned U.S. Pat. Nos. 5,923,027 and 6,313,457, the disclosures of which are incorporated in their entireties herein by reference. The glare sensor and/or ambient sensor automatically control the reflectivity of a self-dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays.

With further reference to FIG. 30, mirror assembly 502 includes first, second, third, and fourth operator interfaces 590, 591, 592, 593 located in mirror bezel 555. Each operator interface is shown to comprise a backlit information display "A", "AB", "A1", and "12". It should be understood that these operator interfaces can be incorporated anywhere in the associated vehicle, for example, in the mirror case, accessory module, instrument panel, overhead console, dashboard, seats, center console, etc. Suitable switch construction is described in detail in commonly assigned U.S. Pat. Nos. 6,407,468; 6,420,800; 6,471,362; and 6,614,579, the disclosures of which are incorporated in their entireties herein by reference. These operator interfaces may control the illumination assemblies, the displays, the mirror reflectivity, a voice-activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIG. 30, it should be understood that fewer or more individual devices may be incorporated in any location within the associated vehicle and as described within the references incorporated herein.

Turning now to FIG. 31, there is shown a section view of a mirror assembly 602, with a reflective electrochromic subassembly 605 adhered to an internal plate frame 621 with double-sided adhesive foam tape 622. Attachment component 634 is screwed to (or integrally formed from) plate frame 621 and defines a crown 672 that engages a ball section 624. The depicted section of FIG. 31 is taken along cut line 6—6 of FIG. 30, shows a preferred positional relationship of third and fourth information displays 626, 641 with respect to reflective EC element 605 along with third information display backlighting 627 within a housing defined by case 656 and bezel 655. Mirror assembly 602 is also shown to comprise a microphone 659; first operator interface 690; along with circuit board 695; mirror mount 657 and accessory module 658. The mirror mount 657 and/or an accessory module 658 may comprise compass sensors, a camera, a headlight control, an additional microprocessor, a rain sensor, additional information displays, additional operator interfaces, etc.

Turning now to FIG. 32, there is shown an exploded view of a mirror assembly 702. FIG. 32 provides additional detail with regard to one preferred positional relationship of individual components, as well as providing additional structural detail of a mirror assembly. Mirror assembly 702 comprises a reflective element 705 within a bezel 755 and a mirror case 756. A mirror mount 757 is included for mounting the mirror assembly within a vehicle. It is noted that a person skilled in the art of vehicle mirror design can re-design the bezel 755, mirror case 756, and tube mount 757 to be replaced with other bezel designs and/or mirror housing designs previously described in this application. It should be understood that a host of accessories may be incorporated into the mount 757 and/or onto the plate frame 621 in addition to a power pack adjuster, such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

Mirror assembly 702 is shown in FIG. 32 to further comprise third information display 726 with third information display backlighting 737, 738, 739; first and second microphones 760, 761; and including other known options such as a first reflector with a first lens; a second reflector with a second lens; a glare sensor; an ambient light sensor; first, second, third, and fourth operator interfaces 790, 791, 792, 793, with first, second, third, and fourth operator interface backlighting 790a, 791a, 792a, 793a; a circuit board 795 having a compass sensor module 799; and a daughter board 798 with an input/output bus interface 797.

Preferably, the illumination assemblies with associated light source are constructed in accordance with the teachings of commonly assigned U.S. Pat. Nos. 5,803,579; 6,335,548; 6,335,548; and 6,521,916, the disclosures of which are incorporated in their entireties herein by reference.

Preferably, the glare light sensor and the ambient light sensor are active light sensors as described in commonly assigned U.S. Pat. Nos. 6,359,274 and 6,402,328, the disclosures of which are incorporated in their entireties herein by reference. The electrical output signal from either, or both, of the sensors may be used as inputs to a controller 796 on the circuit board 740 or 795 to control the reflectivity of reflective element 705 and/or the intensity of third information display backlighting. The details of various control circuits for use herewith are described in commonly assigned U.S. Pat. Nos. 5,956,012; 6,084,700; 6,222,177; 6,224,716; 6,247,819; 6,249,369; 6,392,783; and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module 799 is shown to be mounted circuit board 795 in FIG. 32, it should be understood that the sensor module may be located within mount 757, an accessory module 758 positioned proximate mirror assembly 702 or at any location within an associated vehicle such as under a dashboard, in an overhead console, a center console, a trunk, an engine compartment, etc. Commonly assigned U.S. Pat. Nos. 6,023,229, 6,140,933, and 6,968,273, U.S. Pat. Appl. No. 60/360,723, U.S. Pat. Appl. No. 60/360,723 and Attorney Docket GEN10 PP-443 entitled Electronic Compass System, the disclosures of which are incorporated in their entireties herein by reference, described in detail various compass systems for use with the present invention. These systems may be integrated, at least in part, in a common control with information displays and/or may share components with the information displays. In addition, the status of there systems and/or the devices controlled thereby may be displayed on the associated information displays.

Daughter board 798 is in operational communication with circuit board 795. Circuit board 795 may comprise a controller 796, such as a microprocessor, and daughter board 798 may comprise an information display (not shown in FIG. 7). The microprocessor may, for example, receive signal(s) from the compass sensor module 799 and process the signal(s) and transmit signal(s) to the daughter board to control a display to indicate the corresponding vehicle heading. As described herein and within the references incorporated by reference herein, the controller may receive signal(s) from light sensor(s), rains sensor(s) (not shown), automatic vehicle exterior light controller(s) (not shown), microphone(s), global positioning systems (not shown), telecommunication systems (not shown), operator interface(s), and a host of other devices, and control the information display(s) to provide appropriate visual indications.

Controller 796 (or controllers) may, at least in part, control the mirror reflectivity, exterior lights, rain sensor, compass, information displays, windshield wipers, heater, defroster, defogger, air conditioning, telemetry systems, voice recognition systems such as digital signal processor-based voice-actuation systems, and vehicle speed. The controller 796 (or controllers) may receive signals from switches and/or sensors associated with any of the devices described herein and in the references incorporated by reference herein to automatically manipulate any other device described herein or described in the references included by reference. The controller 796 may be, at least in part, located outside the mirror assembly or may comprise a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,465,963; 6,587,573; 6,429,594; 6,379,013; 6,774,988; 6,399,049; and 6,861,809 and U.S. Pat. Appl. Ser. No. 09/678,856; 09/847,197; and 60/404,879, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

It is contemplated that the present invention would be useful in inside or outside rearview mirrors having optical electrochromic mirror elements, convex mirror elements, aspheric mirror elements, planar mirror elements, non-planar mirror elements, hydrophilic mirror elements, hydrophobic mirror elements, and mirror elements having third surface and fourth surface reflectors. It is further contemplated that the present invention will be useful on mirrors that are transflective, or that have a third or fourth surface mirror element with patterns of lines thereon to optimize the effect of visible light (sometimes called "jail bars"). Further, the present invention is useful with mirrors having first surface or fourth surface heaters, anti-scratch layers, and circuit boards including flexible circuit boards, and circuit board and heater combinations, such as heaters having embedded or integrated non-heater functions such as signal ellipses and signal diffusants, locating holes or windows for light pass-through. The present invention is also useful with potted or snap-attached or elastomeric bezels, and useful with carriers having an ultra-flat front surface. Also, additional options can be integrated into the mirrors including signal lighting, key lights, radar distance detectors, puddle lights, information displays, light sensors and indicator and warning lighting, retainers with living hinges, and integrated housings for receiving and supporting said components. Still further, it is conceived that the present mirror can include a manually folding or power folding mirrors, extendable mirrors, and mirrors with a wide field of view, and with information on the mirror such as "object in mirror is closer than may appear" or other indicia, such as "heated" or "auto-dim". Still further, the present invention is useful with a blue glass mirror or "blue chemical" darkening mirror. Still further, efficiencies can be had by incorporating the present concepts with mirrors having an electrochromic mirror subassembly with front and rear glass mirror elements with edges having a "zero offset"(i.e. less than about 1-mm difference between perfect alignment edges of the mirror elements), an edge seal, including clear reflective or opaque edge seals, and/or second surface chrome or a chrome bezel.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A rearview mirror for vehicles comprising:
   an integrated plate frame;
   an electrochromic mirror subassembly including at least one glass element and electrochromic material, the subassembly being supported on a front of the plate frame;
   a circuit configured to operate the electrochromic material supported by the plate frame; and
   a cover supported by the plate frame and covering at least one of a rear and edges of the plate frame.

2. The rearview mirror defined in claim 1, wherein the cover encloses and covers the rear of the plate frame, and including a bezel that covers an edge of the at least one glass element of the electrochromic mirror subassembly.

3. The rearview mirror defined in claim 1, wherein the electrochronic mirror subassembly is supported against a flat front surface of the plate frame.

4. The rearview mirror defined in claim 1, wherein the electrochromic mirror subassembly is adhered to a flat front surface of the plate frame.

5. The rearview mirror defined in claim 1, wherein the rearview mirror comprises an internal rearview mirror and including a mount operably attached to the plate frame of the mirror for adjustably supporting the mirror.

6. The rearview mirror defined in claim 1, wherein the plate frame includes one of a ball section and socket for forming an adjustable connection for supporting the mirror.

7. The rearview mirror defined in claim 6, wherein the plate frame includes the ball section, with the ball section extending from a rear of the plate frame.

8. The rearview mirror defined in claim 7, including a wireway hole through the ball section.

9. The rearview mirror defined in claim 8, wherein the plate frame includes stem, and includes an aperture in stem for lateral passage of wires.

10. The rearview mirror defined in claim 6, wherein the ball section is integrally formed from material of the plate frame.

11. The rearview mirror defined in claim 6, wherein the plate frame includes an aperture for passthrough of wires.

12. The rearview mirror defined in claim 1, wherein the circuit includes an electrical power-using device mounted directly to plate frame.

13. The rearview mirror defined in claim 12, wherein the plate frame acts as one of a heat sink and a ground for the electrical power-using device.

14. The rearview mirror defined in claim 1, wherein the plate frame includes an aperture that forms a window, and including a display positioned in the window for viewing from a front of the mirror.

15. The rearview mirror defined in claim 1, including a button mounted on the plate frame.

16. The rearview mirror defined in claim 1, wherein the plate frame is made of metal.

17. The rearview mirror defined in claim 16, wherein the plate frame is made of steel.

18. The rearview mirror defined in claim 16, wherein the plate frame is made of one of deep-draw steel and magnesium.

19. The rearview mirror defined in claim 1, wherein the plate frame extends at least 80% of a total width of the mirror subassembly and at least 80% of a total height of the mirror subassembly and the cover.

20. The rearview mirror defined in claim 1, including an electrical device supported on the plate frame that gives off EMI/RFI emissions, and wherein the plate frame acts as an EMI/RFI shield to block the EMI/RFI emissions.

21. The rearview mirror defined in claim 1, wherein the plate frame includes a wire-management structure for containing and managing wires and for assisting in the routing of the wires.

22. The rearview mirror defined in claim 21, wherein the wire-management structure includes a channel.

23. The rearview mirror defined in claim 1, wherein the cover is concavely-shaped and comprises a back cover that encloses at least a rear of the plate frame.

24. The rearview mirror defined in claim 1, wherein the adhesive is an adhesive tape.

25. A rearview mirror for vehicles comprising:
   an integrated plate frame;
   an electrochromic mirror subassembly including at least one glass element and electrochromic material, the subassembly being supported on a front of the plate frame;
   a circuit configured to operate the electrochromic material supported by the plate frame; and
   a cover supported by the plate frame and covering at least one of a rear and edges of the plate frame;
   including an electrical device supported on the plate frame that gives off EMI/RFI emissions, and wherein the plate frame acts as an EMI/RFI shield to block the EMI/RFI emissions;
   wherein the plate frame includes a tab bent from the plate frame that forms an overhand over the electrical device to block the EMI/RFI emissions.

26. A rearview mirror for vehicles comprising:
   an internal metal structural backing plate having a flat front surface; and
   an electrochromic mirror subassembly including front and rear glass elements and electrochromic material therebetween, the subassembly being uniformly supported on the front surface of the metal backing plate for impact resistance; and
   electrical devices mounted to the backing plate; and
   wherein the backing plate acts as a heat sink for the electrical devices.

27. A rearview mirror for vehicles comprising:
   an internal metal structural backing plate having a flat front surface;
   an electrochromic mirror subassembly including front and rear glass elements and electrochromic material therebetween, the subassembly being adhered with an adhesive to and uniformly supported on the front surface of the metal backing plate for impact resistance; and electrical devices mounted to the backing plate;

wherein at least some of the electrical devices generate EMI and RFI emissions, and wherein the backing plate acts as an EMI/RFI shield.

28. A rearview mirror for vehicles comprising:

an internal metal structural backing plate having a flat front surface; and an electrochromic mirror subassembly including front and rear glass elements and electrochromic material therebetween, the subassembly being adhered with an adhesive to and uniformly supported on the front surface of the metal backing plate for impact resistance;

wherein the backing plate includes wire-management features for managing and locating wires and for assisting in routing the wires.

29. A rearview mirror for vehicles comprising:

an internal metal structural backing plate having a flat front surface; and an electrochromic mirror subassembly including front and rear glass elements and electrochromic material therebetween, the subassembly being adhered with an adhesive to and uniformly supported on the front surface of the metal backing plate for impact resistance;

wherein the backing plate includes a channel formed therein.

30. A rearview mirror for vehicles comprising:

an internal metal structural backing plate having a flat front surface; and an electrochromic mirror subassembly including front and rear glass elements and electrochromic material therebetween, the subassembly being adhered with an adhesive to and uniformly supported on the front surface of the metal backing plate for impact resistance;

wherein the backing plate includes one of a ball section and a socket for forming a ball-and-socket connection for adjustably attaching the backing plate to a support component.

31. The rearview mirror defined in claim 30, wherein the one of the ball section and the socket of the ball-and-socket connection is integrally formed from material of the backing plate.

32. A rearview mirror for a vehicle comprising;

a plate frame;

a rearview mirror subassembly including at least one glass element and electrochromic material, the rearview mirror subassembly being supported on a front of the plate frame;

a rearview mirror housing at least partially surrounding the rearview mirror subassembly; and a mount connected to the plate frame;

wherein the rearview mirror housing does not support the rearview mirror subassembly; and wherein the plate frame supports the rearview mirror housing.

* * * * *

UNITED STATES PATENT AND TRADEMARK OFFICE
CERTIFICATE OF CORRECTION

PATENT NO. : 7,287,868 B2  Page 1 of 3
APPLICATION NO. : 10/405526
DATED : October 30, 2007
INVENTOR(S) : John W. Carter et al.

It is certified that error appears in the above-identified patent and that said Letters Patent is hereby corrected as shown below:

Title page, item [57]
Abstract
Line 6, after "rear" insert --surface--.

Figure 21:
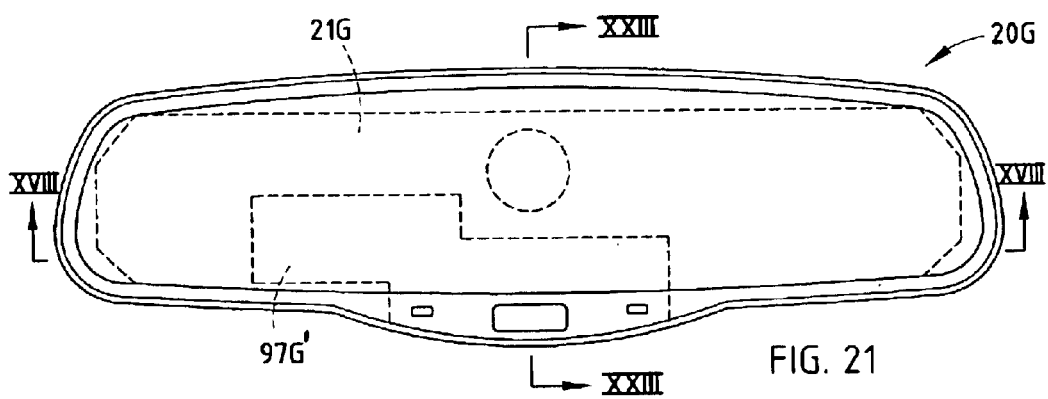
Figure 22:
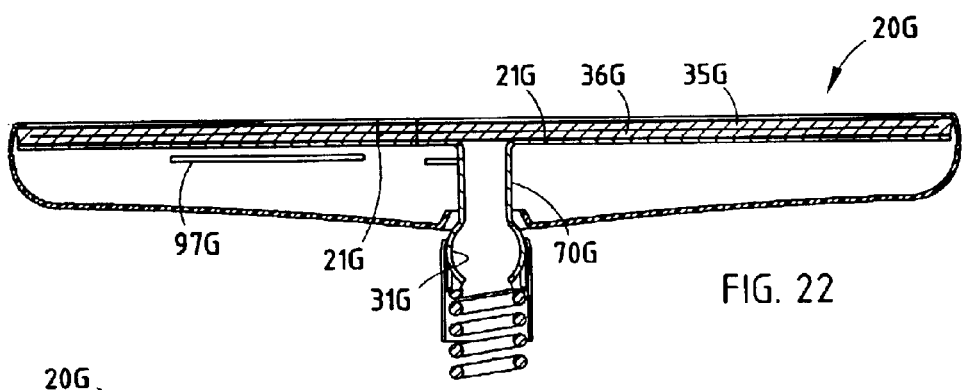
FIGS. 22–23 are cross sections taken along the lines XXII—XXII and XXIII—XXIII in FIG. 21.

Drawings
Delete Drawing Fig. 21, and replace with Drawing Fig. 21 as shown below.

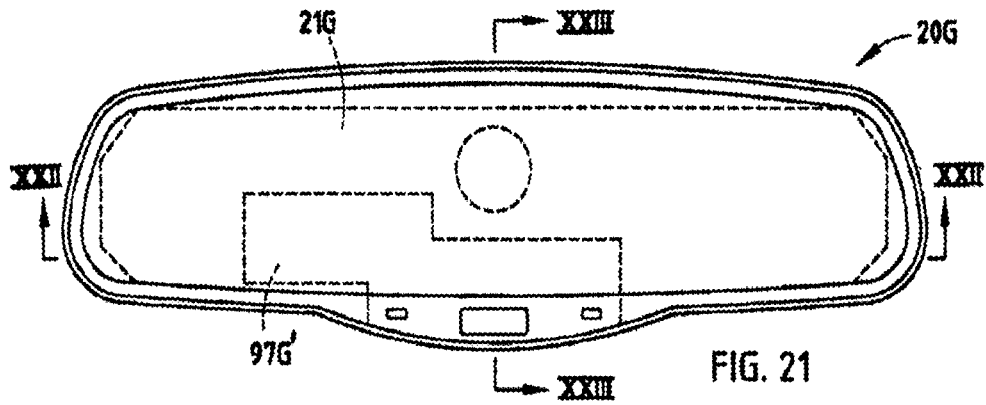

Figure 25:
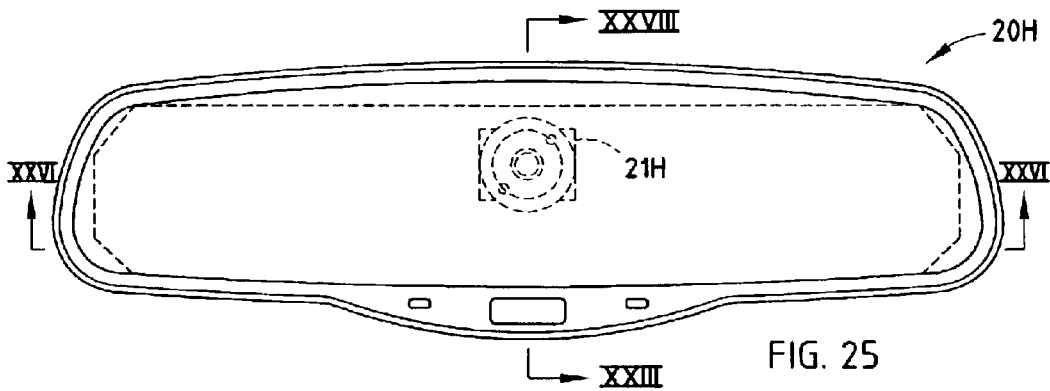
Figure 26:
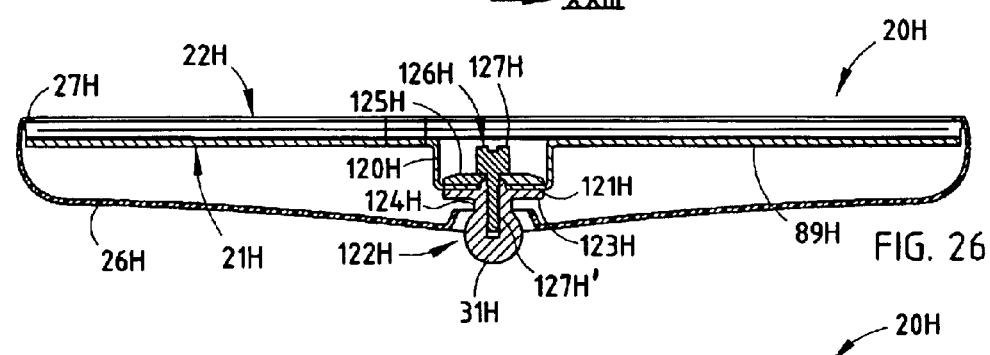
FIGS. 26–29 are cross sections, FIGS. 26 and 28 being taken along the lines XXVI—XXVI and XXVIII—XXVIII in FIG. 25, and FIGS. 27 and 29 being similar to FIGS. 26 and 28 but with the back cover and bezel removed for clarity.
Figure 27:
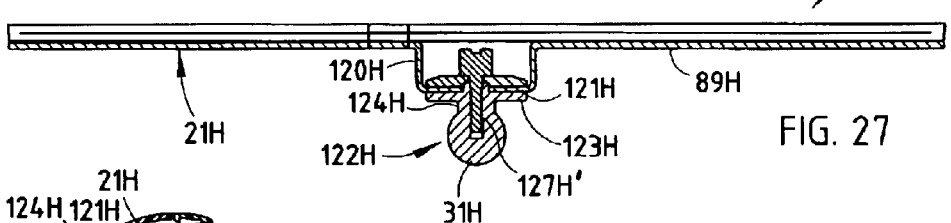
Figure 28:
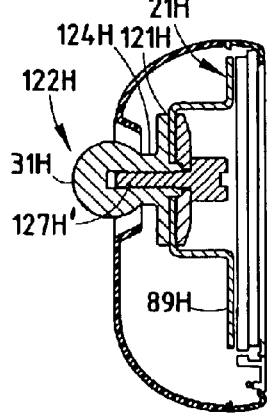
Figure 29:
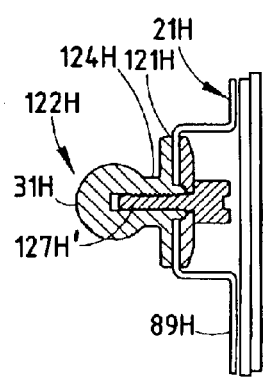

Delete Drawing Fig. 25, and replace with Drawing Fig. 25 as shown below.

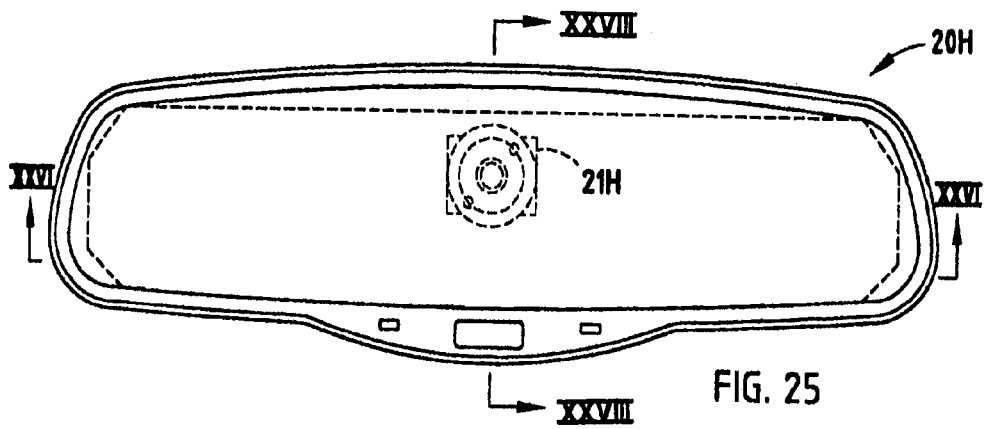

UNITED STATES PATENT AND TRADEMARK OFFICE
CERTIFICATE OF CORRECTION

PATENT NO.       : 7,287,868 B2
APPLICATION NO.  : 10/405526
DATED            : October 30, 2007
INVENTOR(S)      : John W. Carter et al.

Figure 14:
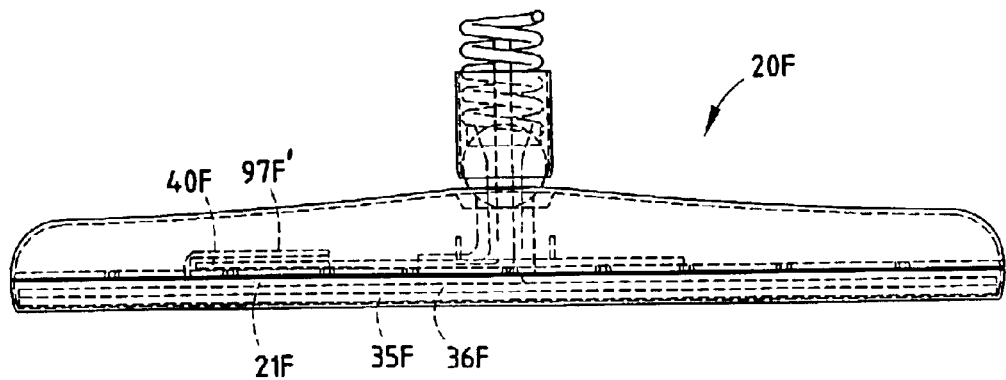
FIGS. 14–15 are top and front views of a mirror embodying the present invention.
Figure 15:
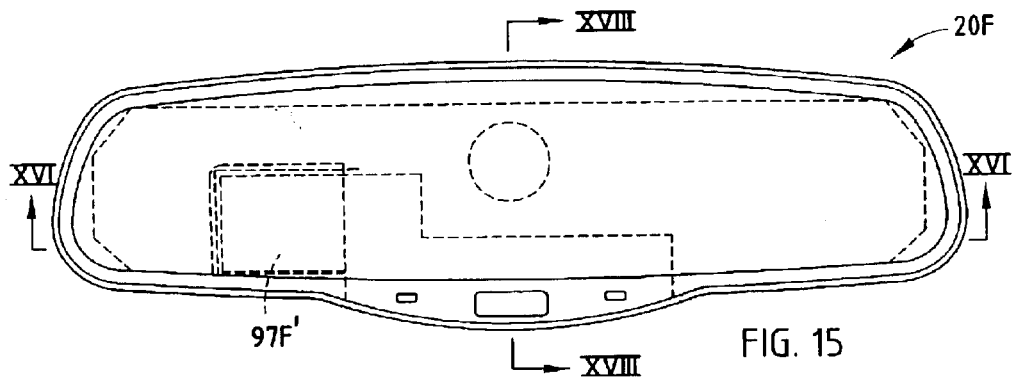
Figure 16:
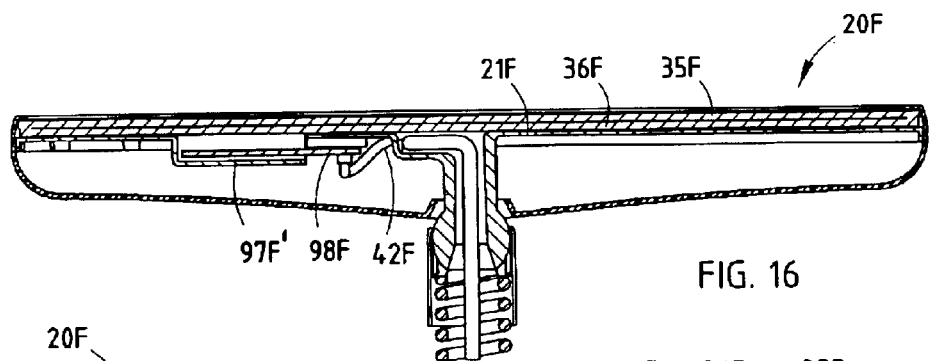
FIGS. 16–18 are cross sections, FIGS. 16 and 18 being taken along the lines XVI—XVI and XVIII—XVIII in FIG. 14, FIG. 17 being similar to FIG. 16 but with the back cover and bezel removed for clarity.
Figure 17:
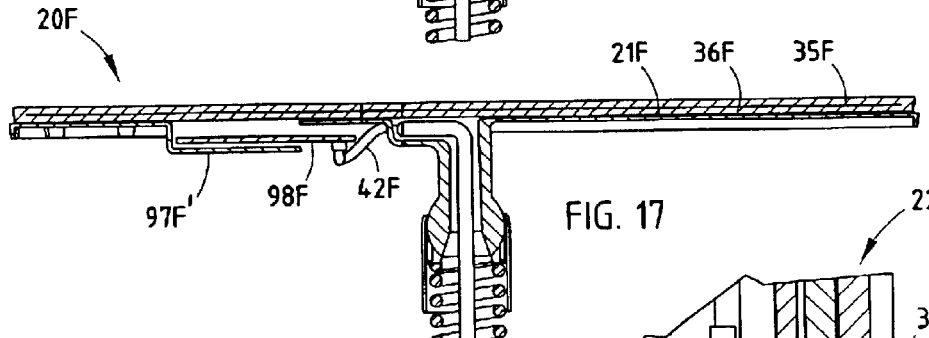
Figure 18:
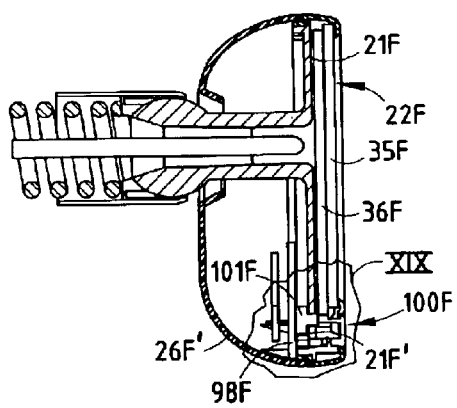
Figure 19:
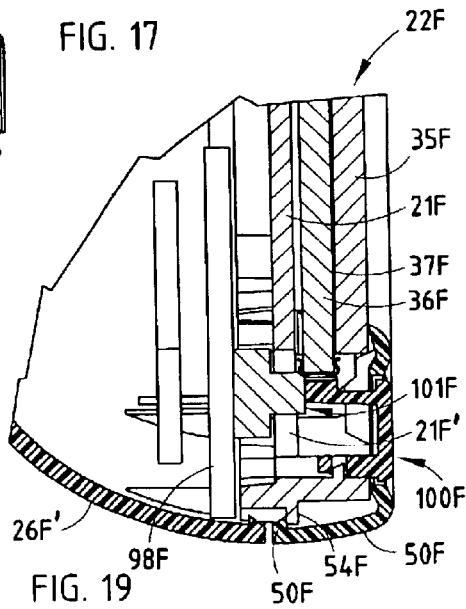
FIG. 19 is an enlargement of the circled area XIX in FIG. 18.
Figure 20:
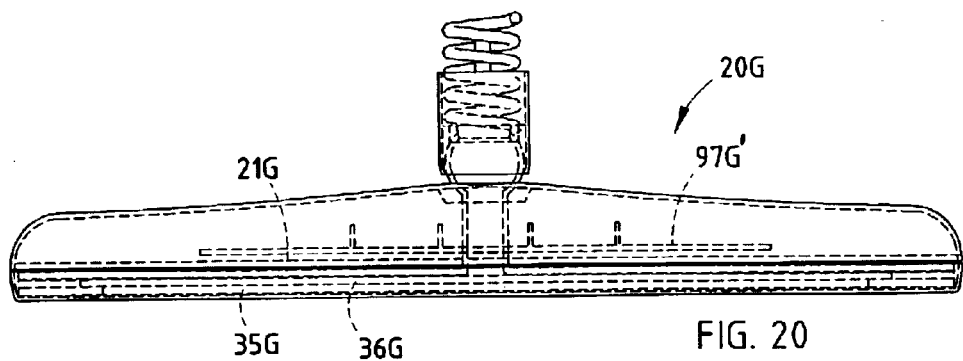
FIGS. 20–21 are top and front views of a mirror embodying the present invention.

It is certified that error appears in the above-identified patent and that said Letters Patent is hereby corrected as shown below:

Column 4
Lines 22-23, "Fig. 14" should be --Fig. 15--.

Column 5
Line 15, ", (comma)" should be --. (period)--.

Column 6
Line 34, "has" should be --have--.

Column 7
Line 26, delete "displays" (1st occurrence).

Column 8
Line 32, "wall 26" should be --wall 26"--.

Column 9
Line 15, delete "are".

Column 10
Line 24, "lower portion 89C" should be --lower portion 89C'--.

Column 12
Line 39, after "within" insert --the--.
Line 65, "6,6,4,579" should be --6,614,579--.

Column 13
Line 12, delete "S. 6,335,548 (2nd occurrence)".

Column 14
Line 22, "shows" should be --showing--.
Line 22, "cut line 6-6" should be --cut line VI-VI--.

Column 15
Line 3, delete "6,335,548 (1st occurrence)".
Line 17, "6,224,716" should be --6,244,716--.
Line 32, delete "U.S. Pat. Appl. No. 60,360,723".
Line 33, "GEN10 PP-443" should be --GEN10 PP-433--.

UNITED STATES PATENT AND TRADEMARK OFFICE
CERTIFICATE OF CORRECTION

PATENT NO. : 7,287,868 B2
APPLICATION NO. : 10/405526
DATED : October 30, 2007
INVENTOR(S) : John W. Carter et al.

It is certified that error appears in the above-identified patent and that said Letters Patent is hereby corrected as shown below:

Column 17
Claim 7, line 51, "a rear" should be --the rear--.
Claim 9, line 55, before "stem" insert --a-- ($1^{st}$ occurrence);
Claim 9, line 55, before "stem" insert --the-- ($2^{nd}$ occurrence);
Claim 12, line 64, before "plate frame" insert --the--.

Signed and Sealed this

Twenty-second Day of July, 2008

JON W. DUDAS
*Director of the United States Patent and Trademark Office*